April 25, 1944.  W. E. MITTON  2,347,495
PROCESSING MACHINE FOR CANNED FOODS
Filed April 22, 1941   5 Sheets-Sheet 3

Inventor
William E. Mitton
By Edwin Stuart
Attorney

April 25, 1944.    W. E. MITTON    2,347,495
PROCESSING MACHINE FOR CANNED FOODS
Filed April 22, 1941    5 Sheets-Sheet 4

William E. Mitton, Inventor

By Edwin Stewart, Attorney

Inventor
William E. Mitton

Patented Apr. 25, 1944

2,347,495

UNITED STATES PATENT OFFICE 2,347,495

PROCESSING MACHINE FOR CANNED FOODS

William E. Mitton, Shawano, Wis.

Application April 22, 1941, Serial No. 389,817

10 Claims. (Cl. 126—272)

The following description deals with my invention in a processing machine for canned foods. Generally speaking the machine has been devised to provide facilities for rapidly sterilizing foods in sealed cans and then immediately cooling the cans and the contained material. In the case of many products, especially evaporated and canned milk, care must be taken to sterilize the product uniformly in the quickest possible time so that the material will not be altered in flavor, viscosity or color. This offers an exceptional problem since the heat of sterilization does not readily pass through the material uniformly.

The primary object of my invention therefore to provide means for rapidly and uniformly sterilizing food products such, for example, as evaporated milk.

Incidentally, due to such processing, the cans containing the material are subjected to considerable internal pressure and it is a feature of my invention to counteract this during the step of sterilization and subsequently until the cans are cooled and the internal pressure relieved. In this way there is a minimum of spoilage and waste.

A further object of my invention is to provide for receiving the cans in the sterilizer, forwarding or advancing them, transferring them to one or more coolers in succession and finally discharging them for subsequent handling all in timed sequence.

It is also an object of my invention to provide novel means for forwarding or advancing the cans during the several stages of treatment, and in some instances delivering the cooling medium in the most efficient manner.

Figure 1:
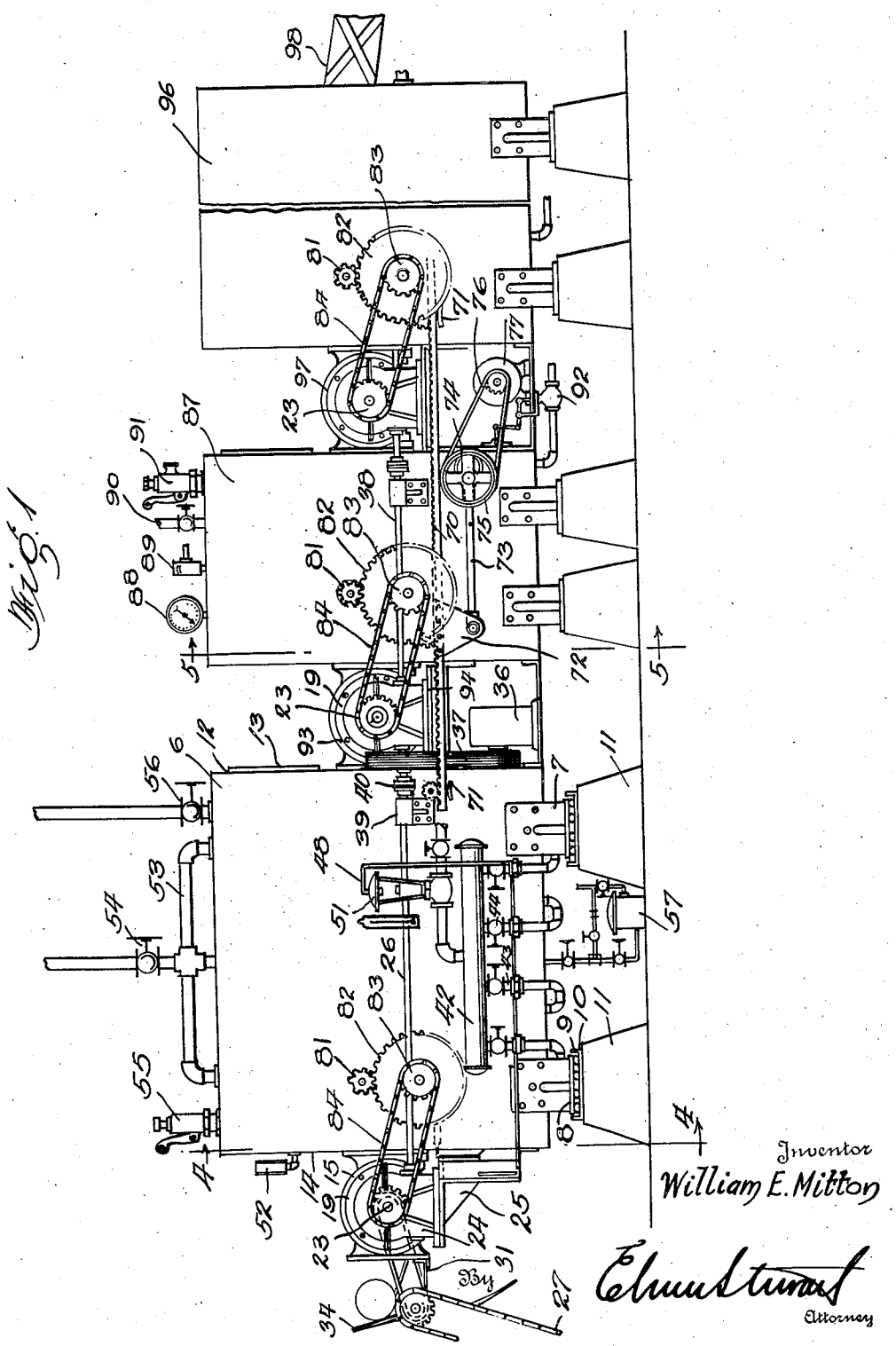
Figure 2:
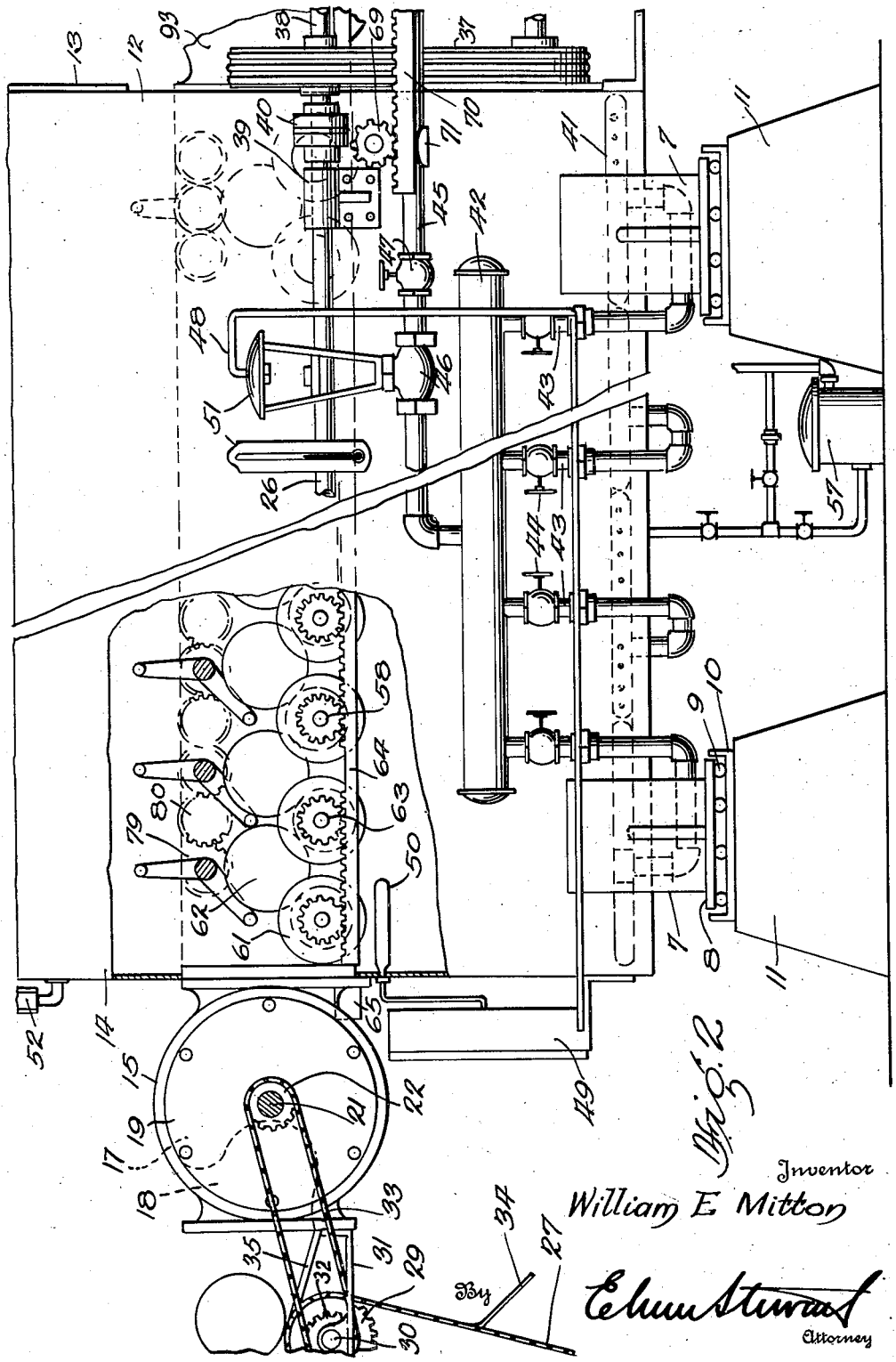
Figure 3:
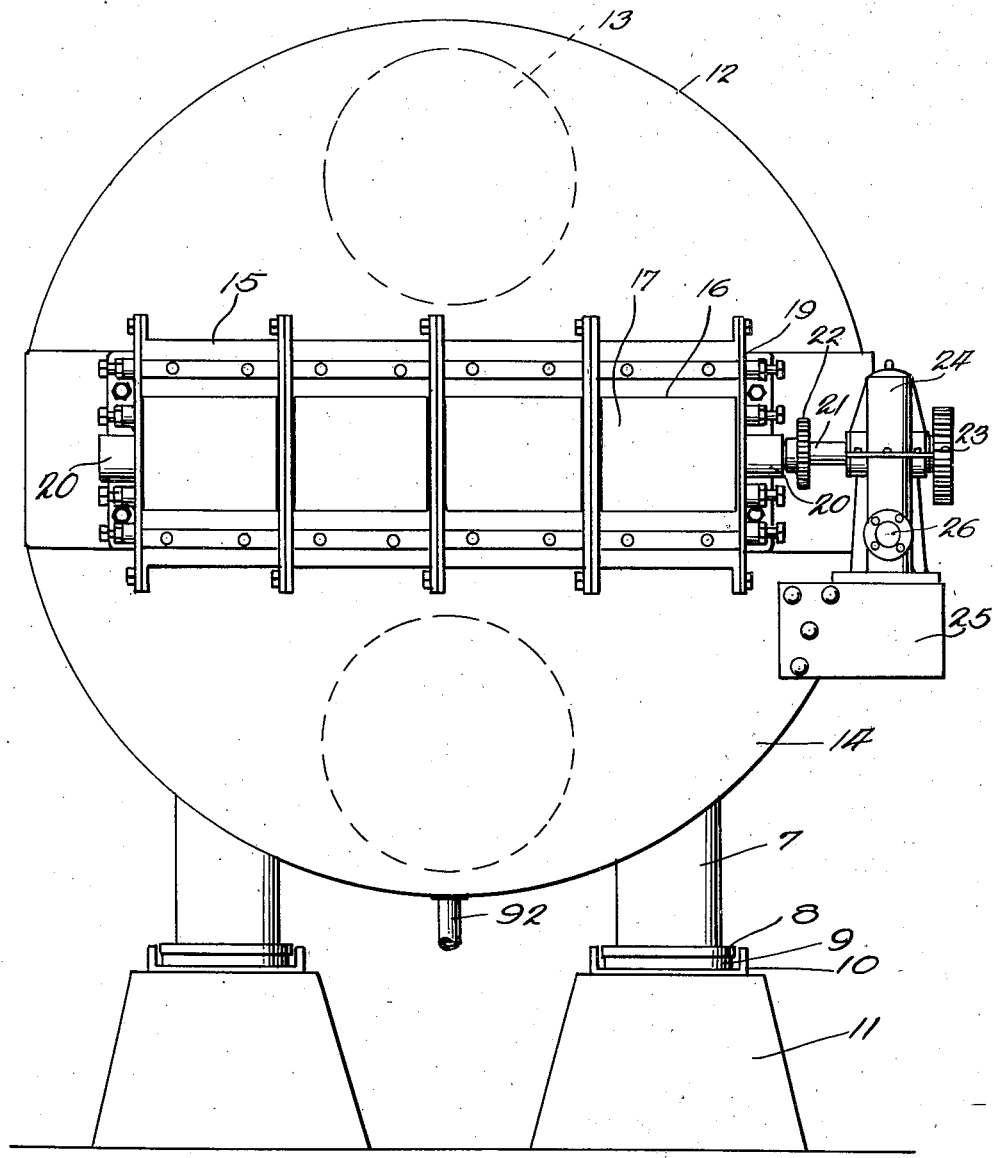
Figure 4:
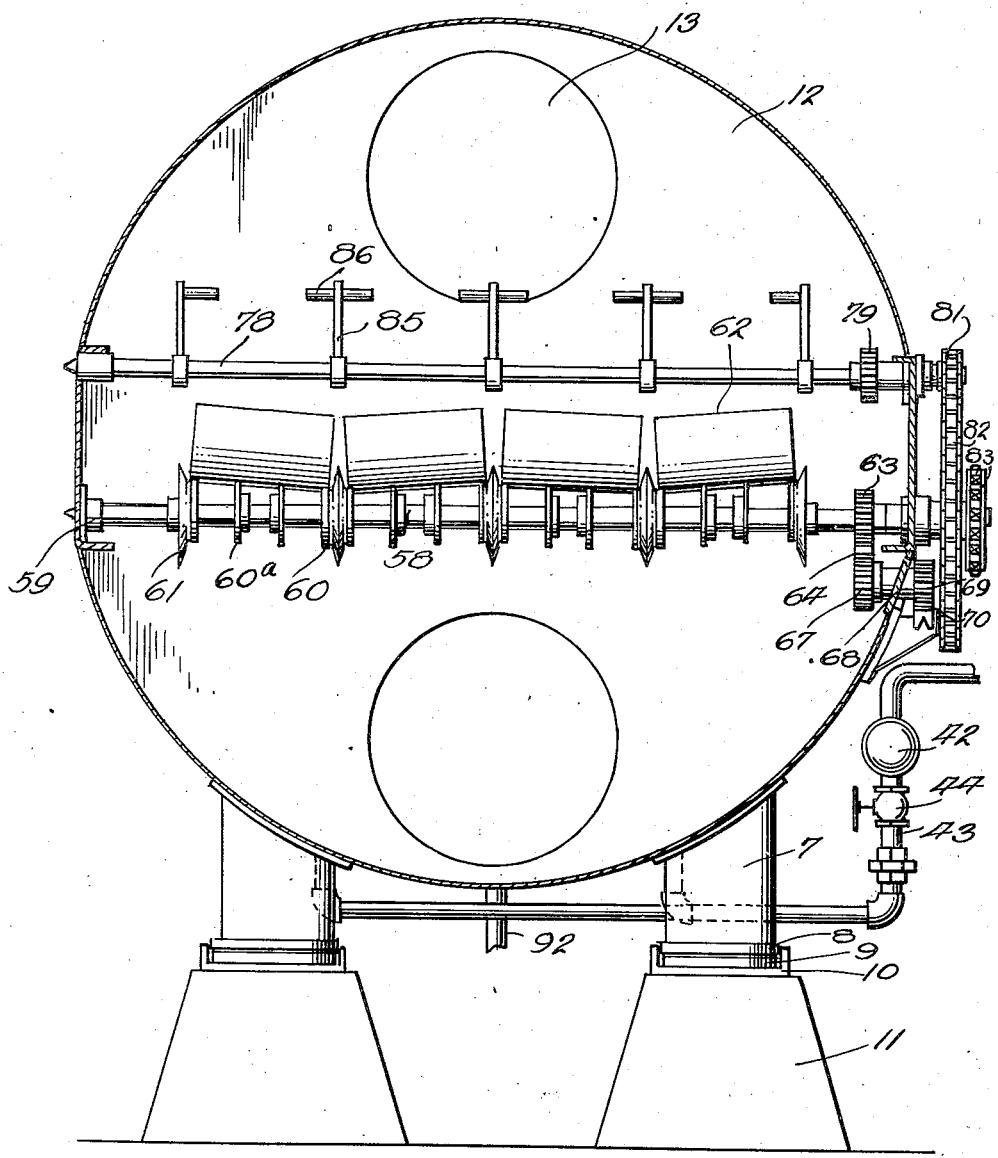
Figure 5:
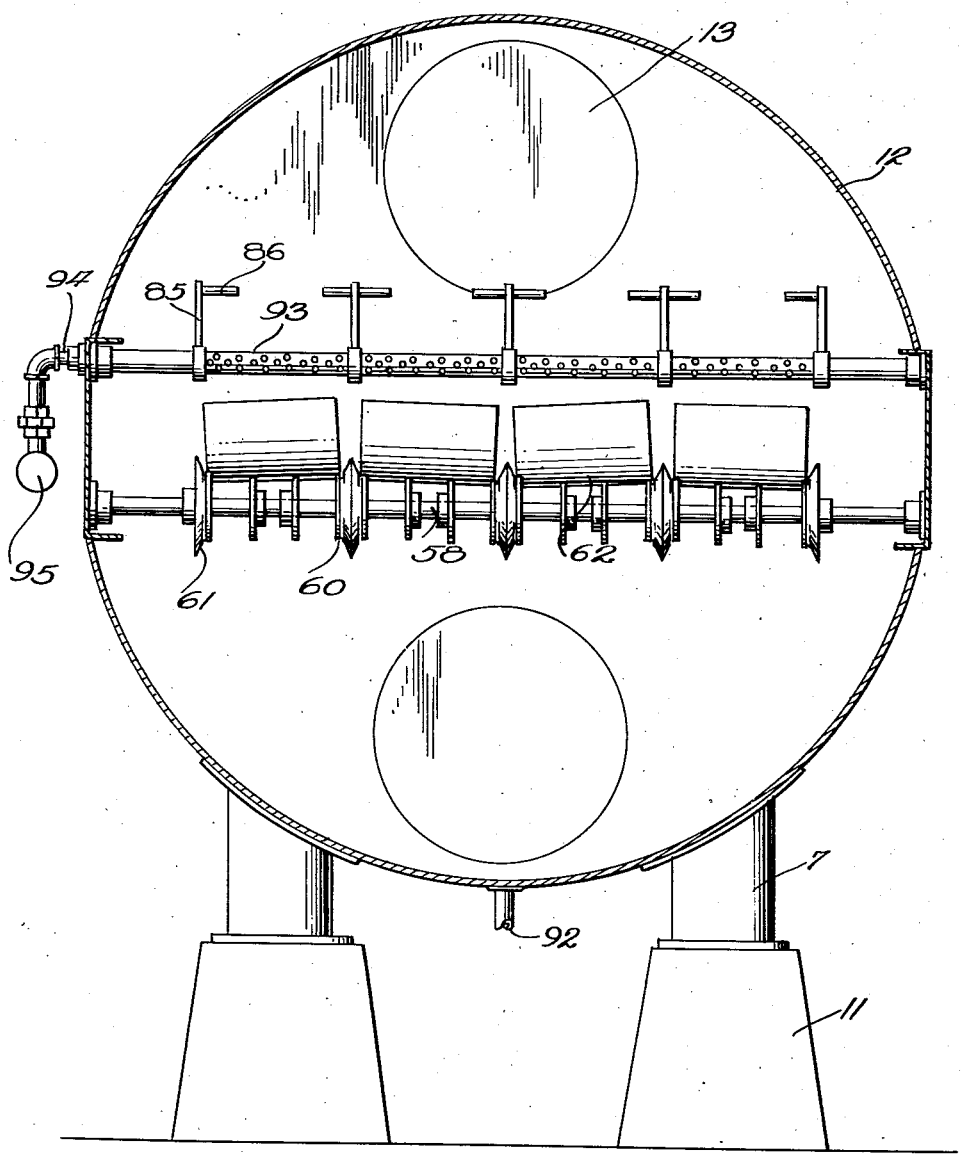

Other further objects of my invention will be evident from the description of the improved machine as disclosed in the accompanying drawings in which, Fig. 1 is a side elevation of the machine, Fig. 2 is a side elevation, partly in section of the sterilizer and forwarding or advancing mechanism, Fig. 3 is an end elevation of the sterilizer with the can inlet valve, Fig. 4 is a vertical cross-section of the sterilizer on the line 4—4 of Fig. 1, and Fig. 5 is a similar vertical cross-section of one of the cooling units taken on a line 5—5 of Fig. 1, and omitting the operating mechanism otherwise illustrated.

By way of example but without limitation, I have illustrated the preferred form of my invention in the drawings above referred to. The first treating unit is the sterilizer which comprises a chamber 6. This is of sheet metal and of any suitable shape and proportions. As illustrated, it is a generally cylindrical chamber having a horizontal axis. The size is determined by the speed of the sterilizing operation and the quantity of cans under treatment at any one time. As illustrated the sterilizer will treat simultaneously four rows of 14 cans each.

The chamber 6 is mounted on legs 7 which have horizontal flat plates, 8. These plates in turn rest upon rollers 9 free to move longitudinally of the sterilizer on the platforms 10. The platforms form part of the foundation pedestals 11.

The rear end 12 of the sterilizer is illustrated with suitable manholes 13. These will be provided also in the front end 14.

Front end 14 has an inlet valve housing 15. This housing has identical front and rear faces, one of which is bolted to the front end 14 of the sterilizer. The housing is divided into a series of compartments equal in number to the rows of cans being processed. The compartments 16 are separated from each other by air-tight partitions. Each compartment 16 has a rotary valve 17. This rotary valve is provided with a series of close fitting pockets 18, each of which will receive a can of the size being treated.

The end casings 19 of the valve housing have journals 20 for a valve shaft 21 upon which the rotary valves 17 are keyed. Beyond one end casing 19 the shaft 21 is extended and carries sprocket gears 22 and 23.

Intermediate the sprocket gears, shaft 21 passes through a reduction gearing 24. This gearing is mounted upon bracket 25 and consists of a large gear and a small worm on shaft 26. The shaft 26 receives power from a motor.

The inlet of the rotary valve 17 is fed by an endless conveyor 27 mounted upon the bracket 31. The conveyor passes over an upper gear 29 the shaft 30 of which is journaled on bracket 31. Shaft 30 carries a sprocket 32 and a sprocket chain 33 drives the gear from the sprocket 22.

The endless conveyor has flights 34 each of which are sufficiently long to serve all of the rows of the valve. The guide 35 slopes from the conveyor 27 to the inlet of the valve so that the cans will roll down the guide by gravity in timed sequence to fill each valve pocket as it is presented in the opening of the valve housing.

The motor 36 is placed near the rear end of the sterilizer 6 and includes a variable speed changer. A multiple pulley drive 37 connects the motor with the driven countershaft 26. This is journaled at 39 on the side of the sterilizer. The shaft is in the form of sections connected by couplings 40.

The bottom of the sterilizer contains a series of steam distribution pipes 41. These are perforated and supply steam throughout the length of the sterilizer. A steam header 42 is provided and has connecting pipes 43 with individual valves 44. The steam main 45 is connected to the header 42 by means of a regulating valve 46. In advance of the regulating valve is a cut-off valve 47.

An air line 48 controls the regulating valve 46 and in turn is connected to the recording thermometer and temperature regulator 49. The thermometer of this regulator is shown at 50 on Fig. 2.

An indicating thermometer 51 is mounted on the side of the sterilizer.

On the front of the sterilizer is provided a pressure gauge 52 while on the top, there is an air-vent 53 having valve 54, a safety valve 55 and an exhaust valve 56. Beneath the sterilizer there is provided a water trap 57.

The sterilizer contains suitable agitating and forwarding means for the cans as they leave the inlet valve. The agitating means consists of a series of cross shafts 58 which are journaled at 59 in the opposite side walls of a chamber. Each shaft has a series of spaced crowned eccentric rollers 60 separated from each other by slightly less than the length of the cans 62 which they are to support. Each roller has an upstanding flange 61 which serves as a guide to prevent the cans becoming misplaced or interfering with the cans on the adjacent rows. Intermediate split collars 60a support the cans and prevent their falling between the shafts.

At one side of the chamber each shaft is provided with a spur gear 63 as shown in Figs. 2 and 4. Beneath the gear 63 there is an engaging rack 64 that extends the full length of the sterilizing chamber. This rack is permitted considerable length of travel as its ends may pass through the ends of the sterilizer and into the pockets 65. The lower face of the rack 64 has a second series of rack teeth (not shown) in engagement with a spur gear 67. This gear is mounted on shaft 68 and passes through the side wall of the sterilizer as shown in Fig. 4. Outside of the side wall the shaft carries an outer gear 69. This gear is in mesh with a reciprocating outer rack 70 supported on slide bearings 71.

The rack also carries a bracket plate 72 which forms a pivot for a pitman 73. The opposite end of the pitman is journaled on an eccentric 74 on the shaft of pulley 75. The belt 76 connects pulley 75 to a variable speed motor 77. In this way rapid oscillating motion is given the shafts 58. The forwarding means for the cans as shown in Fig. 2 consists of a series of transfer arms mounted on cross shafts 78. These shafts are journaled in opposite sides of the sterilizing chamber and at one end have gears 79. Idle gears 80 are between the gears of adjacent shafts. One shaft is extended through the side wall of the chamber and carries an intermittent spur gear 81. This spur gear engages a larger intermittent spur gear 82. The ratio between the gears 82 and 81 may be any desired one but preferably the ratio is 8 to 1 (for gallon cans). The shaft of the large gear 82 carries a small pinion 83 which is connected by chain 84 to the gear 23.

The cross shaft 78 carries transfer arms 85 as shown in Fig. 4 and these terminate in bars 86 which contact the sides of the cans 62. The cross shafts 78 rotate intermittently and periodically engage the cans for the purpose of moving them forward one step and bringing them to rest in the next adjacent pair of supporting rollers.

The sterilizer 6 is followed by a cooler formed by chamber 87. This chamber is also provided with pressure gauge 88 air pressure regulator 89, exhaust 90 and relief valve 91. The cooling material is a constant supply of cold water which is carried away by the float operated drain 92. The cooler has the same rolling support mounted on pedestals as described for the sterilizer.

The cooler 87 is connected to the sterilizer 6 by air-tight transfer valve 93. This is mounted on platform 94 and is of the same description as that of the inlet valve 17.

The countershaft passes through a reduction gearing similar to that used with the inlet valve 17.

The cooler 87 has the same type of agitating cross shafts above described. They are illustrated in Fig. 5 and are shown to be beneath forwarding shafts 93. These shafts are hollow and perforated as shown in Fig. 5. The shafts are journalled loosely on pipe 94 which is slotted at its bottom and through which a supply of cooling water is drawn from pipe 95.

In case of cans of the one gallon size it is necessary to follow the cooling in cooler 87 by a second cooling step without super-atmospheric pressure. This second cooling chamber 96 is connected by a transfer valve 97 to the cooler 87. The cooler 96 has similar agitating means and forwarding means as in the cooler 87. Also its method of cooling is that described for the cooler 87. Its discharge opening however is unrestricted and leads to chute 98 which is designed to up-end individual cans and deliver them to any suitable conveyor.

The power for the inlet valves and feeding conveyor is supplied by the single countershaft from motor above described. Each inlet valve shaft is connected to the gearing by which the forwarding arms are connected in both the sterilizer and the coolers. The single exterior rack serves to supply power for agitating or oscillating the cans rapidly in each of the chambers.

The arrangement above described receives a supply of filled cans on any suitable conveyor and transfers them first into the sterilizer. The cans on each row are treated alike and receive rapid alternate oscillation while the steam pressure is on. Periodically the cans in each row are forwarded or advanced one step to receive further rapid oscillation. In this way the heat is rapidly introduced into the contents of the cans in a uniform manner. This avoids overheating the material near the can walls before the centrally held material is heated.

At the end of travel in the sterilizer the cans are delivered to the transfer valve which then places them in cooler 87 without loss of pressure. In the sterilizing operation the cans develop internal pressure which must be counteracted by exterior pressure in both the sterilizer and the first cooler. In the cooler the cans are rapidly oscillated and periodically advanced while being subjected to jets of cooling water and at an elevated pressure. Rapid cooling of the cans and their contents results in reduction of internal pressure. The cans then travel out of the cooler 87. Small cans may be sufficiently cooled to deliver directly to a conveyor or other handling device. However, in the case of large cans such as one gallon capacity, I have found it desirable to use a second cooler operating in the same manner as cooler 87 without however maintaining pressure above that of the atmosphere. Thus the cans from the second cooler are delivered directly to any suitable chute or conveyor.

By providing the rollers 60 with crowned grooved peripheries, the individual cans 62 are supported on their sides inwardly from the flange or edge of the cans. This reduces the wear upon the material of the can and places it at points where the can will later be protected or covered by the label. By making rollers 60 eccentric the cans rock back and forth or tilt from end to end so that the small air space will be shifted and the contents agitated to a greater degree. By providing the intermediate split collars 60a having their peripheries eccentric and on the lines connecting the peripheries of the rollers, as shown in Fig. 4, the cans are supported more effectively during oscillation and rocking so that there is less slippage. In addition the intermediate collars fill the space between the rollers so that there is no possible chance of the cans being dislodged and accidentally falling between the shafts 58.

While the preferred form of my machine has been set out above in detail, the details of construction and arrangement and proportions may be altered to accomplish the desired results and without departing from the scope of the appended claims.

I claim:

1. A machine for processing material in cans, comprising a sterilizing chamber, separate means for maintaining the chamber at regulated temperature and super-atmospheric pressure, means for feeding cans into the chamber, a series of spaced parallel transverse shafts in the chamber, can supporting rollers on each shaft, gears on each shaft, a common rack engaging said gears, means for giving said rack rapid reciprocation, means for periodically advancing the cans simultaneously from one pair to the next succeeding pair of supporting rollers, and means for conveying the cans out of the chamber.

2. A machine for processing material in cans, comprising a sterilizing chamber, separate means for maintaining the chamber at regulated temperature and super-atmospheric pressure, means for feeding a transverse row of cans into the chamber, a series of spaced parallel transverse shafts in the chamber, a plurality of spaced rollers on each shaft for supporting a row of cans upon adjacent shafts, gears on each shaft, a common rack engaging said gears, means for giving said rack rapid reciprocation, means for periodically advancing the rows of cans simultaneously from between adjacent shafts to between the next succeeding adjacent shafts, and means for conveying the cans out of the chamber.

3. A machine for processing material in cans, comprising a sterilizing chamber, separate means for maintaining the chamber at regulated temperature and super-atmospheric pressure, means for feeding a transverse row of cans into the chamber, a series of spaced parallel transverse flanged rollers on each shaft for supporting a row of cans upon adjacent shafts, gears on each shaft, a common rack engaging said gears, means for giving said rack rapid reciprocation, means for periodically advancing the rows of cans simultaneously from between adjacent shafts to between the next succeeding adjacent shafts, and means for conveying the cans out of the chamber.

4. A machine for processing material in cans, comprising a sterilizing chamber, separate means for maintaining the chamber at regulated temperature and super-atmospheric pressure, means for feeding a transverse row of cans into the chamber, a series of spaced parallel transverse shafts in the chamber, a plurality of spaced rollers on each shaft for supporting a row of cans upon adjacent shafts, gears on each shaft, a common rack engaging said gears, means for giving said rack rapid reciprocation, means for periodically lifting the cans of each row simultaneously from between adjacent shafts to a position between the next succeeding pair of shafts, and means for conveying the cans out of the chamber.

5. A machine for processing material in cans, comprising a sterilizing chamber, separate means for maintaining the chamber at regulated temperature and super-atmospheric pressure, means for feeding a transverse row of cans into the chamber, a series of spaced parallel transverse shafts in the chamber, a plurality of spaced rollers on each shaft for supporting a row of cans upon adjacent shafts, gears on each shaft, a common rack engaging said gears, means for giving said rack rapid reciprocation, a series of spaced parallel transverse shafts each overlying a space between two shafts in the first named series of shafts, means for constantly rotating the upper shafts, can engaging arms on said upper shafts, and means for conveying the cans out of the chamber beyond the last shaft in the lower series.

6. A machine for processing material in cans comprising a chamber, means for maintaining the chamber at a super-atmospheric pressure, means for feeding a transverse row of cans into the chamber, a series of spaced parallel transverse shafts in the chamber, a plurality of spaced rollers on each shaft for supporting a row of cans upon adjacent shafts, gears on each shaft, a common rack engaging said gears, means for giving said rack rapid reciprocation, means for periodically advancing the rows of cans simultaneously from between adjacent shafts to between the next succeeding adjacent shafts, heat transfer means for treating the cans while supported and advanced on said rollers and means for conveying the cans out of the chamber.

7. A machine for processing material in cans, comprising a sterilizing chamber, separate means for maintaining the chamber at regulated temperature and super-atmospheric pressure, means for feeding a transverse row of cans into the chamber, a series of spaced parallel transverse shafts, a plurality of spaced flanged eccentric rollers on each shaft for supporting a row of cans upon adjacent shafts, gears on each shaft, a common rack engaging said gears, means for giving said rack rapid reciprocation, means for periodically advancing the rows of cans simultaneously from between adjacent shafts to between the next succeding adjacent shafts and 8. A machine for processing material in cans, comprising a sterilizing chamber, separate means for maintaining the chamber at regulated temperature and super-atmospheric pressure, means for feeding a transverse row of cans into the chamber, a series of spaced parallel transverse shafts, a plurality of spaced flanged eccentric rollers on each shaft for supporting a row of cans upon adjacent shafts, adjacent rollers on the same shaft having opposite eccentricity, gears on each shaft, a common rack engaging said gears, means for giving said rack rapid reciprocation, means for periodically advancing the rows of cans simultaneously from between adjacent shafts to between the next succeeding adjacent shafts and means for conveying the cans out of the chamber.

9. A machine for processing material in cans, comprising a sterilizing chamber, separate means for maintaining the chamber at regulated temperature and super-atmospheric pressure, means for feeding a transverse row of cans into the chamber, a series of spaced parallel transverse shafts, a plurality of spaced flanged eccentric rollers on each shaft for supporting a row of cans upon adjacent shafts, the successive rollers on the same shaft having opposite eccentricity, intermediate supporting collars on the shafts, gears on each shaft, a common rack engaging said gears, means for giving said rack rapid reciprocation, means for periodically advancing the rows of cans simultaneously from between adjacent shafts to between the next succeeding adjacent shafts and means for conveying the cans out of the chamber.

10. A machine for processing material in cans, comprising a sterilizing chamber, separate means for maintaining the chamber at sterilizing temperature and pressure, means for feeding a transverse row of cans into the chamber, a series of spaced parallel transverse shafts, a plurality of spaced flanged rollers on each shaft for supporting a row of cans upon adjacent shafts, the peripheries of said rollers being grooved adjacent said flanges, gears on each shaft, a common rack engaging said gears, means for giving said rack rapid reciprocation, means for periodically advancing the rows of cans simultaneously from between adjacent shafts to between the next succeeding adjacent shafts and means for conveying the cans out of the chamber.

WILLIAM E. MITTON.